United States Patent [19]
Kellis

[11] Patent Number: 6,032,787
[45] Date of Patent: Mar. 7, 2000

[54] CONVEYOR BELT MONITORING SYSTEM AND METHOD

[75] Inventor: John K. Kellis, Winfield, Ala.

[73] Assignee: FMC Corporation, Chicago, Ill.

[21] Appl. No.: 08/998,926

[22] Filed: Sep. 12, 1997

[51] Int. Cl.[7] .................................................. B65G 43/02
[52] U.S. Cl. .................................... 198/810.02; 198/502.1
[58] Field of Search ............................ 198/502.1, 810.02

[56] References Cited

U.S. PATENT DOCUMENTS

| | | | |
|---|---|---|---|
| 3,651,506 | 3/1972 | Olaf et al. ....................... | 198/810.02 X |
| 3,899,071 | 8/1975 | Duffy ................................. | 198/810.02 |
| 5,318,077 | 6/1994 | Yamashita ....................... | 198/810.02 X |

FOREIGN PATENT DOCUMENTS

| | | | |
|---|---|---|---|
| 2140873 | 2/1973 | Germany | .............................. 198/502.1 |
| 28 54 562 | 6/1980 | Germany | . |
| 0153671 | 1/1982 | Germany | ........................... 198/810.02 |
| 0280306 | 7/1990 | Germany | ........................... 198/810.02 |
| 56-161208 | 12/1981 | Japan | ................................. 198/810.02 |

*Primary Examiner*—James R. Bidwell
*Attorney, Agent, or Firm*—Pauley Petersen Kinne & Fejer

[57] ABSTRACT

A conveyor belt condition monitoring system having a signal emitter for emitting at least one detectable signal disposed on one side of a conveyor belt, a signal receiver for receiving the detectable signal disposed on the opposite side of the conveyor belt, and a controller for controlling the emission of the at least one detectable signal and for monitoring the extent of blockage and/or transmission of the detectable signal by the conveyor belt.

18 Claims, 2 Drawing Sheets

CONVEYOR BELT MONITORING SYSTEM AND METHOD

FIELD OF THE INVENTION

This invention relates to a system for monitoring the condition of a bulk material conveyor belt system belting. More particularly, this invention relates to a conveyor belt condition monitoring system suitable for identifying three types of physical damage which can occur to the belting in a bulk material conveyor belt system; (1) failure of belt fastening devices, (2) reduction in belt strength due to reductions in competent belt width, and (3) longitudinal belt rips.

BACKGROUND OF THE INVENTION

Currently, the condition of conveyor belts is determined through physical inspections which are periodically performed on the belts. However, it is frequently the case that physical damage of the belt occurs between inspections, giving rise to the possibility of catastrophic failures which are very costly. Accordingly, there is a need in the conveyor belt market for a device which continually monitors the condition of the conveyor belt during operation of the conveyor belt system.

At the present time, such products are available on the market for monitoring conveyor belts for longitudinal belt rips. These products utilize antenna devices molded into the conveyor belt at specified intervals. A longitudinal belt rip in the vicinity of an antenna causes the antenna to break, the breakage of which provides notification to the conveyor belt system operator of a rip in the belt. However, belt rips which occur in regions of the belt disposed between the antenna devices are not detected until the rip reaches an antenna, thereby causing it to break. An additional problem with these systems is the internal failure of the antennas, resulting in the system being ineffective until the failed antenna or antennas can be replaced.

It is, thus, one object of this invention to provide a conveyor belt condition monitoring system which is able to continuously monitor the condition of the belt.

It is another object of this invention to provide a conveyor belt condition monitoring system which is capable of detecting not only longitudinal belt rips, but also failures of fastening devices and reductions in competent belt width which reduce belting strength.

It is still a further object of this invention to provide a conveyor belt condition monitoring system which eliminates the need to install antennas in the conveyor belt as is required by other belt rip detection products.

SUMMARY OF THE INVENTION

These and other objects of this invention are achieved by a conveyor belt condition monitoring system comprising a signal emitter for emitting at least one detectable signal, a signal receiver for receiving the detectable signal, and a controller for controlling the emission of the at least one detectable signal and for monitoring the extent of blockage or transmission of the detectable signal from the signal emitter to the signal receiver. The signal emitter is disposed on one side of the conveyor belt and the signal receiver is disposed on the opposite side of the conveyor belt, positioned in a manner with respect to the signal emitter whereby, in the event of a rip in the belt, a failure of the belt fastening devices, or a reduction in competent belt width, the detectable signal emitted by the signal emitter and blocked by the belt from transmission to the signal receiver is detectable by the signal receiver.

More particularly, during operation of the bulk material conveyor belt system, a belt without rips, failures of the fastening devices, or reductions in competent belt width blocks the detectable signal emitted by the signal emitter, thereby preventing its reception by the signal receiver. However, when physical damage to the belt occurs resulting in a longitudinal rip, a failure of one or more of the fastening devices, or a reduction in competent belt width, the previously blocked detectable signal is transmitted through the damaged portion of the belt to the signal receiver. Thus, the signal receiver must be aligned in a manner which enables reception of the transmitted detectable signal in the event of physical damage to the belt.

The conveyor belt condition monitoring system of this invention is a continuous monitoring system monitoring the condition of the operating conveyor on a continuous basis and warning the operator of impending danger. The prevention of a catastrophic failure which the system of this invention affords can provide considerable cost savings to an operator by detecting the potential of a catastrophic failure before it occurs.

The method for determining the condition of a conveyor belt in accordance with this invention comprises positioning a detectable signal emitter on one side of the conveyor belt and a detectable signal receiver on the opposite side of the conveyor belt. The detectable signal emitter has a plurality of detectable signal emitting elements which span the width of the conveyor belt and the detectable signal receiver has a capability of receiving each detectable signal emitted by the detectable signal emitter. Each of the detectable signal emitting elements of the detectable signal emitter is sequentially activated in accordance with a preset sequence to emit a detectable signal. The extent of blockage or transmission of the detectable signals from the detectable signal emitter to the detectable signal receiver is then monitored. When the amount of signal blockage or transmission exceeds a preset value, an alarm is sounded warning the operator of the potential for a failure of the belt.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
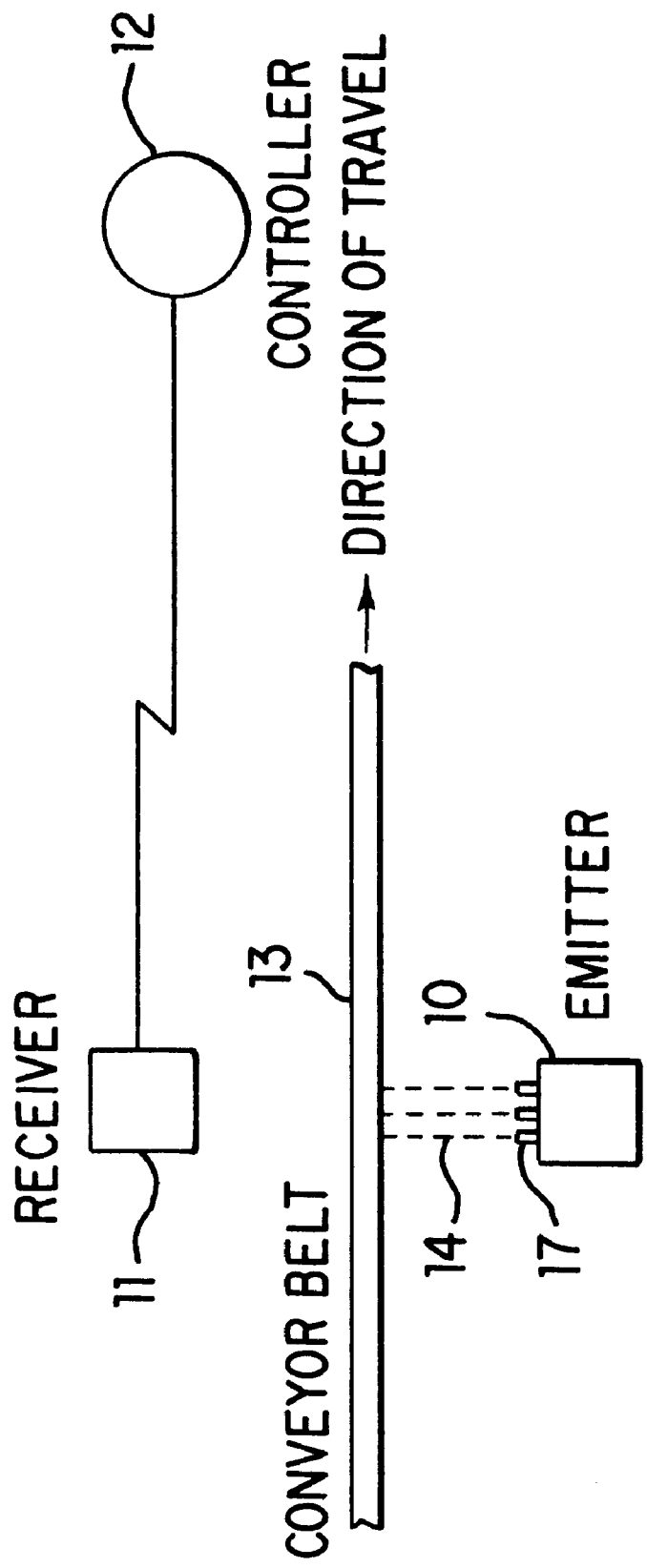
FIG. 1 is a schematic diagram of a portion of a conveyor belt system utilizing the conveyor belt condition monitoring system of this invention.

FIG. 1 is a diagram of the conveyor belt condition monitoring system in accordance with this invention. The conveyor belt condition monitoring system comprises a signal emitter 10, a signal receiver 11, and controller 12. Signal emitter 10 is disposed on one side of conveyor belt 13 and signal receiver 11 is disposed on the opposite side of conveyor belt 13. Signal emitter 10 emits at least one detectable signal 14 directed toward conveyor belt 13. Signal receiver 11 is preferably aligned with signal emitter 10 such that an imaginary line drawn between signal emitter 10 and signal receiver 11 is perpendicular to the plane of conveyor belt 13. In this way, it can be assured that signal receiver 11 is aligned with signal emitter 10 in a manner which will enable signal receiver 11 to receive any detectable signals 14 emitted by signal emitter 10 and passing through conveyor belt 13 due to physical damage thereto.

Figure 2A:
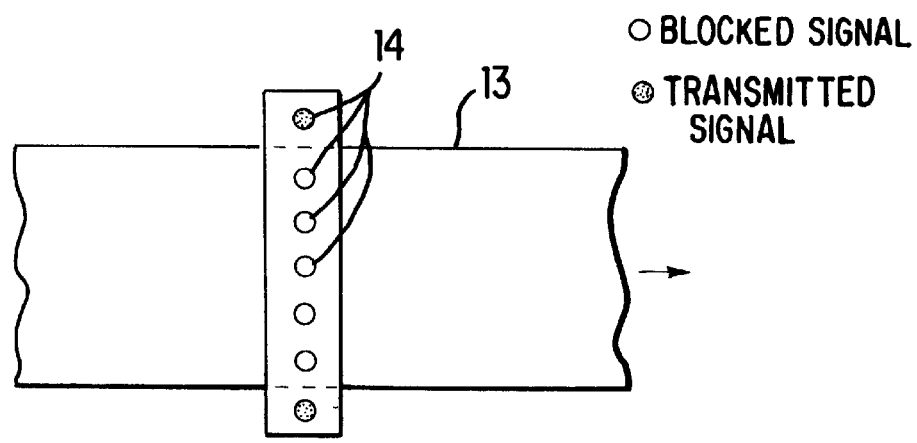
FIGS. 2A–2C are schematic diagrams demonstrating the manner in which physical damage to a conveyor belt is detected by the conveyor belt condition monitoring system of this invention.
Figure 2B:
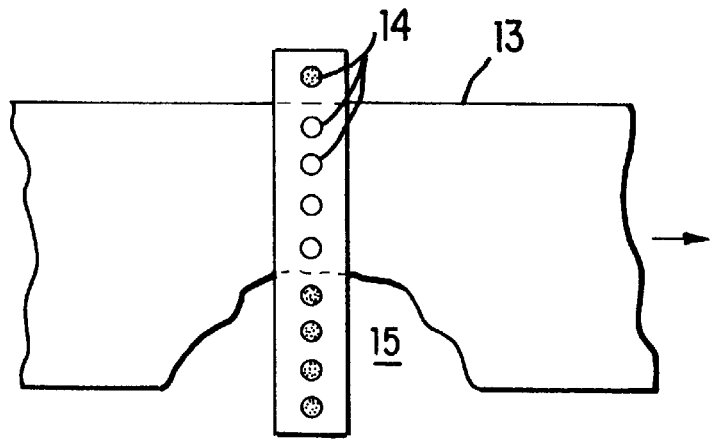
Figure 2C:
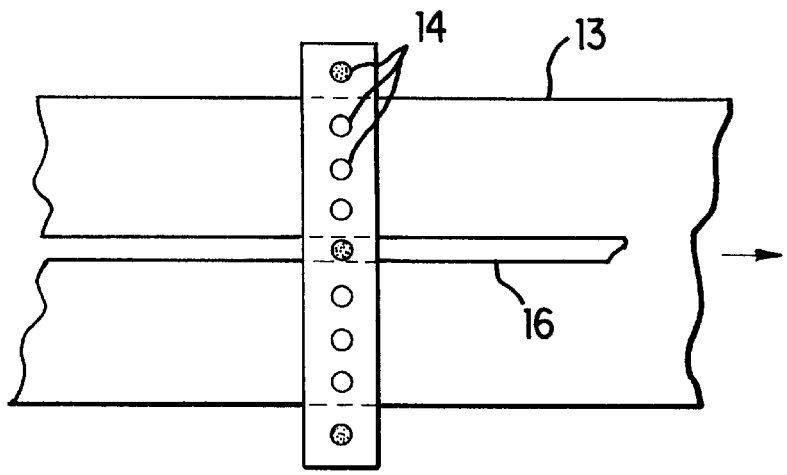

Operation of the conveyor belt condition monitoring system of this invention is generally shown in FIGS. 2A, 2B and 2C. As shown in FIG. 1, signal emitter 10 comprises a plurality of emitter elements 17, each of which emits a detectable signal 14. As shown in FIGS. 2A, 2B and 2C, emitter elements 17 are arranged so as to produce a plurality of detectable signals 14 which span the width of conveyor belt 13. As shown in FIG. 2A, a competent conveyor belt 13 blocks all of the detectable signals 14, as indicated by the open circles, spanning belt 13. Detectable signals which are not blocked by belt 13 are shown as blackened circles. A competent conveyor belt is one which is substantially free of physical damage.

FIG. 2B shows a conveyor belt 13 for which the competent belt width has been reduced by the area designated as element 15. As a result, the number of blocked signals 14 is reduced with a corresponding increase in the number of transmitted detectable signals. Controller 12 connected to receiver 11 determines the amount of blocked detectable signals and/or transmitted detectable signals and relates it to an equivalent width of a competent conveyor belt. As the width of competent and the amount of transmitted detectable signal would increase to a preset value, resulting in activation of an alarm.

The alarm can be used to identify the nature and location of the physical damage to conveyor belt 13 for personal inspection. Controller 12 comprises scanning means for sequentially activating each of emitter elements 17 in a preset sequence. The time period between activation of each detectable signal emitting element 17 is variable depending upon belt speed of conveyor belt 13. A cycle time for activating each of the detectable signal emitting elements 17 can thus be determined. For example, we have found that, for a 7 ft. wide belt, a cycle time of 0.01156 seconds per complete scan of all emitter elements with an activation time of 55 microseconds per element provides good results. Knowing the cycle time for sequentially activating each of the detectable signal emitting elements 17 and the speed of conveyor belt 13, the distance that conveyor belt 13 travels from the time that an alarm is activated by controller 12 can readily be determined thereby permitting precise determination of the location in conveyor belt 13 at which the alarm was activated.

In the event that the amount of blocked detectable signal decreases or transmitted detectable signal increases, indicating a decrease in competent belt width, to a critical value, controller 12 can de-energize the conveyor belt system so that the damaged portion of the belt can be located for repair.

As shown in FIG. 2C, the conveyor belt condition monitoring system of this invention can be utilized to evaluate not only competent belt width, but also other types of belt damage, such as longitudinal belt rips 16. When a longitudinal rip 16 occurs, controller 12, based upon a recognition of the blocked/transmitted detectable signal pattern, is able to identify the physical damage to the belt as being a longitudinal rip.

Various combinations of detectable signal emitters and receivers are suitable for use in the conveyor belt condition monitoring system of this invention. In accordance with a particularly preferred embodiment of this invention, the signal emitter is an optical or light emitter which emits at least one detectable signal in the form of a light beam. In accordance with a particularly preferred embodiment, the detectable signal emitted by the optical emitter is an infrared light beam.

Another suitable detectable signal for use in the system of this invention is a sound wave. Accordingly, in accordance with one embodiment of this invention, signal emitter 10 is a sonic emitter which emits at least one detectable signal in the form of a directional sound wave and signal receiver 11 is capable of detecting directional sound waves.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A conveyor belt condition monitoring system comprising:
   a signal emitter for emitting at least one detectable signal, said signal emitter disposed on one side of a conveyor belt and comprising a plurality of emitter elements arranged so as to span a width of said conveyor belt;
   a signal receiver for receiving said detectable signal disposed on the opposite side of said conveyor belt; and
   a controller for controlling emission of said at least one detectable signal and for monitoring an extent of one of a blockage and a transmission of said detectable signal by said conveyor belt, said controller comprising a scanner for sequentially activating each of said emitter elements in a preset sequence.

2. A system in accordance with claim 1, wherein said controller comprises an alarm activator for activating an alarm when said extent of said one of said blockage and said transmission of said detectable signal reaches a preset value.

3. A system in accordance with claim 1, wherein said signal emitter comprises an optical emitter and said at least one detectable signal comprises a light beam.

4. A system in accordance with claim 3, wherein said at least one detectable signal comprises an infrared light beam.

5. A system in accordance with claim 1, wherein said signal emitter comprises a sonic emitter and said at least one detectable signal comprises a directional sound wave.

6. A system in accordance with claim 1, wherein said controller means further comprises means for determining a type of damage to said conveyor belt based upon said extent of said one of said blockage and said transmission of said detectable signal by said conveyor belt.

7. A method for determining a condition of a conveyor belt comprising:
   positioning a detectable signal emitter on one side of a conveyor belt and a detectable signal receiver on an opposite side of said conveyor, said detectable signal emitter having a plurality of detectable signal emitting elements which span a width of said conveyor belt, and said detectable signal receiver having a capability of receiving each detectable signal emitted by said detectable signal emitter;
   sequentially activating each of said detectable signal emitting elements in accordance with a preset sequence to emit a detectable signal; and
   monitoring an extent of one of a blockage and a transmission of said detectable signals from said detectable signal emitter to said detectable signal receiver.

8. A method in accordance with claim 7, wherein said detectable signal comprises an optical signal.

9. A method in accordance with claim 7, wherein said detectable signal comprises a directional sound wave.

10. A method in accordance with claim 7, wherein a time period for said sequentially activating each of said detectable signal emitting elements is varied dependent upon a belt speed of said conveyor belt.

11. A method in accordance with claim 8, wherein said detectable signal comprises an infrared light beam.

12. A method in accordance with claim 7, wherein an alarm is activated by a controller for controlling said detectable signal emitter and said detectable signal receiver when said extent of said one of said blockage and said transmisson reaches a preset value.

13. A conveyor belt system comprising:
   a movable conveyor belt;
   a signal emitter for emitting at least one detectable signal disposed on one side of said movable conveyor belt and comprising a plurality of emitter elements arranged so as to span a width of said conveyor belt;
   a signal receiver for receiving said detectable signal disposed on the opposite side of said conveyor belt, said signal receiver capable of receiving said at least one detectable signal emitted by said signal emitter; and
   a controller for controlling emission of said at least one detectable signal and for monitoring an extent of one of a blockage and a transmission of said detectable signal by said conveyor belt from said signal emitter to said signal receiver, said controller comprising scanning means for sequentially activating each of said emitter elements in a preset sequence.

14. A conveyor belt system in accordance with claim 13, wherein said controller comprises an alarm activator for activating an alarm when said extent of said one of said blockage and said transmission of said detectable signal reaches a preset value.

15. A conveyor belt system in accordance with claim 13, wherein said signal emitter comprises an optical emitter and said at least one detectable signal comprises a light beam.

16. A conveyor belt system in accordance with claim 15, wherein said at least one detectable signal comprises an infrared light beam.

17. A conveyor belt system in accordance with claim 13, wherein said signal emitter comprises a sonic emitter and said at least one detectable signal comprises a directional sound wave.

18. A conveyor belt system in accordance with claim 13, wherein said controller further comprises means for determining a type of damage to said conveyor belt based upon said extent of said one of said blockage and said transmission of said detectable signal by said conveyor belt.

* * * * *